United States Patent Office
3,390,456
Patented July 2, 1968

3,390,456
DENTAL COMPOSITION AND METHOD OF USE
Joseph A. Deleva, 99 Pine St.,
West Springfield, Mass. 01089
No Drawing. Continuation-in-part of application Ser.
No. 208,483, July 9, 1962. This application Jan. 2,
1964, Ser. No. 335,379
17 Claims. (Cl. 32—15)

This application is a continuation-in-part of co-pending application Ser. No. 208,483 filed July 9, 1962, now abandoned.

This invention pertains to a particular dental composition and more specifically to a liquid dental composition which is suitable for capping a tooth pulp and for for lining the base of a dental cavity.

The field of dentistry is often complex and has in recent years made great scientific strides in dental technology. New ideas and new techniques are constantly being discovered and developed. Yet in spite of these developments, there still is the need for some method of capping a tooth pulp or lining the base of a dental cavity in an effective simple manner such as to require minimum preparation of the composition. There are certain dental compositions being employed today for capping a tooth pulp or for lining a dental cavity but these compositions have the drawback of being difficult to handle and cumbersome to use. One such dental composition for capping a tooth pulp and for lining the base of a dental cavity is set forth in U.S. Patent 12,277. Unfortunately, the method so described is difficult and requires much time in preparing the composition. The use of the hot pliers as taught in the prior art could cause the patient much discomfort if too hot. In addition, it could also cause pulp hyperemia or severe damage to the tooth pulp. The ingredients have to be mixed just prior to use since the composition solidifies quickly soon after preparation thereof. Therefore, it would be advantageous to the dental field if there could be available to the dental field a composition which could be used effectively, simply and require a minimum amount of time and effort to prepare the composition for capping a tooth pulp or lining a dental cavity.

It has now been surprisingly discovered that by mixing in certain critical proportions a liquid organic compound with an inorganic compound, the mixture remains liquid at room temperature for extended periods of time. Basically, the mixture consists of liquified thymol and powdered zinc oxide. The application of the composition merely requires placing a drop or two of the liquid composition in the base of the dental cavity or over the dental pulp. The liquid composition is then solidified by contacting the liquid composition with a catalyst agent. In addition, the composition has excellent medicinal value and excellent non-conductive properties.

Therefore, it is an object of this invention to provide a liquid dental composition.

Another object of this invention is to provide a process for preparing a liquid dental composition.

Still another object of this invention is to provide a process for capping a dental pulp.

Further, another object of this invention is to provide a process for lining the base of a dental cavity with a non-conductive liner.

Other objects of this invention will in part be obvious and will in part be set out and appear hereinafter.

Briefly these and other objects of this invention are attained by liquifying a particular organic compound which may be either thymol or halogenated derivatives of thymol and then mixing therewith an inorganic compound. It is essential that the materials be mixed in certain critical proportions. The surprising feature herein is that the composition remains liquid at room temperature for extended periods of time without the use of a solvent. The thymol and thymol derivatives have a melting point in excess of 120° F. and it is believed that the inorganic compound is not soluble in the liquid thymol or liquid thymol derivatives.

The following examples are set forth to illustrate more clearly the principles and practices of this invention to one skilled in the art and they are not intended ot be restrictive but merely illustrative of the invention herein contained. Unless otherwise stated, all parts and percentages contained herein are on a weight basis.

Example I

To 1 part of liquid thymol at 70° C., add 4 parts of zinc oxide powder and mix under slight agitation. The liquid thymol is prepared by heating thymol crystals in a hot water bath at about 70° C. and maintaining the liquid thymol at this temperature. Thymol has a melting point of about 50° C. The zinc oxide has a melting point in excess of 1800° C.

The mixture is still liquid after the addition of the zinc oxide. While still at about 70° C., the liquid mixture is then placed into a glass vial and stopped with a rubber stopper. The vial is kept at room temperature and after about 4 weeks, the mixture is still liquid. The mixture appears to be a uniform dispersion of finely-divided zinc oxide in liquid thymol.

Example II

Example I is repeated except that in place of the 1 part of thymol and 4 parts of zinc oxide, 2 parts of thymol and 1 part of zinc oxide are employed herein.

The results obtained are the same as obtained in Example I.

Example III

Example I is repeated except that in place of the 4 parts of zinc oxide, 2 parts of zinc oxide are employed herein.

The results obtained herein are the same as obtained in Example I.

Example IV

Example I is repeated except that in place of the 4 parts of zinc oxide, 1 part of zinc oxide is employed herein.

At the end of the 4 week period, the mixture is still liquid. The vial is then exposed to a temperature of about 4° C. for 3 hours. At the end of this time, the mixture is still liquid and is still a uniform dispersion of finely-divided zinc oxide in liquid thymol.

Example V

To 1 part of liquid thymol prepared as in Example I, add 1 part of powdered copper oxide and mix under slight agitation. The liquid mixture while still at about 70° C. is placed in a glass vial and stopped with a rubber stopper.

The mixture is then kept at room temperature and after about 4 weeks, the mixture is still a liquid. The mixture is a uniform dispersion of finely-divided copper oxide in liquid thymol.

Examples VI–VIII

Example V is repeated except that in place of copper oxide, powered magnesium hydroxide, calcium oxide and magnesium oxide are employed herein, respectively. The results obtained in these examples are the same as obtained in Example V.

Example IX

A liquid composition is prepared as Example IV by mixing 1 part of liquid thymol prepared by heating crystals of thymol to above the melting point thereof with 1 part of zinc oxide. The liquid mixture is placed in a syringe carpule and then placed into a standard syringe.

Using a plastic facsimile of a dental tooth having a simulated dental cavity, two drops of the liquid mixture prepared above are placed in the cavity using the syringe. The composition lying in the cavity is liquid. In order to set up the composition, a crystal of thymol is brought into contact with the liquid composition. The composition almost immediately solidifies to a hard, rock-like type composition.

Example X

Example IX is repeated except that the liquid is left standing in the simulated dental cavity for 12 hours. The mixture is observed to be still liquid at the end of 12 hours. A crystal of thymol is then brought into contact with the liquid which solidifies the composition as in Example IX.

Example XI

Example IX is repeated except that the carpule is kept at room temperature for about 4 weeks. Several drops of the liquid composition are then placed in the simulated dental cavity. After standing for 12 hours, the mixture in the cavity is still liquid. It is then solidified in the same manner as set forth in Example IX.

The instant invention is directed to a liquid composition and in particular to a liquid dental composition. Furthermore, this invention is also directed to processes for preparing a tooth pulp capping and a liner for a dental cavity. The liquid composition herein comprises in admixture a particular liquid organic compound and an inorganic compound, which organic compound is selected from the group consisting of thymol and halogenated derivatives of thymol. In particular, the halogenated derivatives of thymol are thymol chloride and thymol iodide and mixtures thereof.

In the practice of this invention, it should be emphasized that the component parts be admixed in certain critical proportions. The compositions herein comprise 80–20 weight percent of the particular organic compound in liquid form and, correspondingly, 20–80 weight percent of the inorganic compound. As stated previously, it is imperative and a critical feature of this invention that these materials be mixed in the proportions set forth above. If less than 20 weight percent of the inorganic compound is employed with the liquid organic compound, the mixture will solidify as soon as it is cooled below the melting point of the organic compound. When the component parts are used in the critical proportions set forth herein, the surprising discovery is that the composition remains as a liquid when cooled to room temperature. The examples show that even at the end of 4 weeks at room temperature, the composition is still a liquid. In one or more embodiments of the instant invention, the composition still remained a liquid after 6 months storage at room temperature. As set forth previously, the critical proportions must be in the range of from 80–20 weight percent of the particular organic compound in liquid form and, correspondingly, 20–80 weight percent of the inorganic compound. The preferred range to be employed herein is 65–35 weight percent and more specifically 55–45 weight percent of the particular organic compound and, correspondingly, 35–65 weight percent and more specifically 45–55 weight percent of the inorganic compound.

In the practice of this invention, the particular organic compound employed herein is thymol or halogenated derivatives of thymol or mixtures thereof. More particularly, the halogenated derivatives of thymol are thymol iodide and thymol chloride. The compounds employed herein have known excellent medicinal advantages and inhibit or prevent bacteriological growth. This may be predominantly due to the phenol present in the thymol or thymol derivatives. In the practice of this invention, it is preferred to employ thymol.

The inorganic compound employed herein can be any of the inorganic compounds. They are generally in powdered form and may have extremely high melting points. However, particularly useful are the inorganic compounds having melting points in excess of that of the thymol and the thymol derivatives. These inorganic compounds are preferably selected from the group consisting of the metal oxides, metal carbonates, metal sulfates, metal phosphates and metal hydroxides and mixtures thereof and preferably the earth, earthalkali, alkali and heavy metals thereof. More specifically, the inorganic compounds suitable in the practice of this invention are the carbonates, hydroxides, oxides, phosphates and sulfates of zinc, copper, nickel, iron, manganese, potassium, calcium and aluminum. In one embodiment the metal oxides are preferred and specifically, the oxides of zinc, copper, magnesium, and calcium, and more specifically zinc oxide.

However, it should be emphasized that although in the broad concept of this invention any of the inorganic compounds can be used with the liquid thymol or liquid halogenated derivatives of thymol, as a practical matter, only those compounds which are generally inert or would have no toxic or detrimental effect in dental usage thereof are employed in the preparation of the dental compositions set forth herein.

As stated previously, one of the critical features of the instant invention is in the ratio of the ingredients employed which ratio must be that as set forth above. In order for the composition to remain a liquid and in particular a liquid at room temperature, the ratio of the component parts must be within the critical limits. The process for preparing the composition merely requires first liquefying the thymol or the halogenated derivatives of thymol. The liquefying thereof is accomplished generally by heating the organic material to a temperature above its melting point which organic compounds are normally solid at room temperature. While maintaining the organic compound in the liquid state generally at temperatures considerably above the melting temperature thereof, the inorganic compound is added under slight agitation. The liquid composition of this invention is an admixture of the inorganic compound in the liquid organic compound and preferably a uniform dispersion of the inorganic compound in the liquid composition. The preferred composition would actually be a colloidal suspension. Upon cooling the liquid composition to room temperature, it remains as such without any solidification occurring. The liquid composition can be stored in stoppered containers or in syringe-type carpules. The syringe-type carpules are then ready for immediate use by placing the carpule in a standard syringe and injecting the liquid composition into the dental cavity.

It has also been noted that better performance and mixing is obtained by heating the organic compound to a temperature greatly in excess of its melting point and preferably at least about 20° C. above the melting point thereof. If any solidification should occur, mere reheating will convert the composition to a stable liquid at room temperature having the same excellent storage stability as set forth previously.

When preparing a capping for a dental pulp or a nonconductive base liner in a dental cavity, the liquid composition is merely injected into the opening or cavity with the syringe and carpule. Of course, the amount used will depend upon the size of the opening or cavity and the area to be covered. This liquid composition is then solidified into a uniform hard composition by touching the liquid with a catalyst. The catalyst employed herein is generally a crystal of thymol. This causes virtually immediate setting up of the liquid composition. The hardened composition can then be drilled, polished or scraped as desired. The composition is non-conductive and has certain medicinal properties as well as inhibiting the growth of bacteria.

The advantages of the composition of the instant invention are primarily for dental uses particularly for capping a tooth pulp or lining a dental cavity. Its use is very simple and extremely quick. In addition, the composition has other advantages such as an adhesive for cementing glass, metal or plastics either to each other or to dissimilar materials. Since the composition sets to a hard mass, it can be used as a molding or a casting composition which can be sanded, polished or scraped.

It will thus be seen that the objects set forth above, among those made apparent from the preceding description are efficiently attained and since certain changes may be made in carrying out the above composition or process without departing from the scope of this invention, it is intended that all matter contained in the above description shall be interpreted as illustrative and not in a limiting sense.

What is claimed is:

1. A composition of matter which is liquid at room temperature comprising in admixture (1) 80–20 weight percent of a liquid organic compound selected from the group consisting of thymol and halogenated derivatives of thymol and mixtures thereof, and (2) correspondingly, 20–80 weight percent of an inorganic compound.

2. A composition of matter which is liquid at room temperature compirsing in admixture (1) 80–20 weight percent of a liquid organic compound selected from the group consisting of thymol, thymol chloride and thymol iodide, and mixtures thereof, and (2) correspondingly, 20–80 weight percent of an inorganic compound selected from the group consisting of the metal oxides, metal carbonates, metal sulfates, metal phosphates and metal hydroxides, and mixtures thereof.

3. The composition of claim 2 wherein the composition comprises (1) 65–35 weight percent of the liquid organic compound, and (2) correspondingly, 35–65 weight percent of the inorganic compound.

4. The composition of claim 2 wherein the composition comprises (1) 55–45 weight percent of the liquid organic compound, and (2) correspondingly, 45–55 weight percent of the inorganic compound.

5. The composition of claim 2 wherein the liquid organic compound is thymol.

6. The composition of claim 2 wherein the inorganic compound is selected from the group consisting of metal oxides.

7. The composition of claim 2 wherein the liquid organic compound is 65–35 weight percent of thymol and the inorganic compound is, correspondingly, 35–65 weight percent of zinc oxide.

8. The composition of claim 2 wherein the inorganic compound is finely-divided and uniformly suspended in the liquid organic compound.

9. A process for preparing a dental composition which is liquid at room temperature which comprises liquifying a particular organic compound by heating to above the melting point thereof, admixing therewith an inorganic compound and cooling the dental composition to room temperature; said liquid dental composition comprising in admixture (1) 80–20 weight percent of the particular organic compound which is selected from the group consisting of thymol, thymol chloride and thymol iodide, and mixtures thereof, and (2) correspondingly, 20–80 weight percent of the inorganic compound selected from the group consisting of metal oxides, metal carbonates, metal sulfates, metal phosphates and metal hydroxides, and mixtures thereof.

10. The process of claim 9 wherein the particular organic compound is thymol.

11. The process of claim 9 wherein the inorganic compound is zinc oxide.

12. The process of claim 9 wherein the liquid dental composition comprises in admixture 65–35 weight percent of the particular organic compound and, correspondingly, 35–65 weight percent of the inorganic compound.

13. A process for capping a tooth pulp which comprises capping a tooth pulp with a dental composition which is liquid at room temperature and then solidifying the liquid dental composition by bringing into contact therewith a catalyst; said liquid dental composition comprising of in admixture (1) 80–20 weight percent of a liquid organic compound selected from the group consisting of thymol and halogenated derivatives of thymol, and mixtures thereof, and (2) correspondingly, 20–80 weight percent of an inorganic compound selected from the group consisting of metal oxides, metal carbonates, metal sulfates, metal phosphates, and metal hydroxides, and mixtures thereof; said catalyst being a crystal of thymol.

14. The process of claim 13 wherein the liquid dental composition comprises in admixture 65–35 weight percent of the liquid organic compound and, correspondingly, 35–65 weight percent of the inorganic compound.

15. The process of claim 13 wherein the liquid organic compound is thymol and the inorganic compound is zinc oxide.

16. A process for lining a dental cavity which comprises lining the base of a dental cavity with a dental composition which is liquid at room temperature and then solidifying the liquid dental composition by bringing into contact therewith a catalyst agent; said liquid dental composition comprising of in admixture (1) 80–20 weight percent of a liquid organic compound selected from the group consisting of thymol and halogenated derivatives of thymol and mixtures thereof, and (2) correspondingly, 20–80 weight percent of an inorganic compound selected from the group consisting of metal oxides, metal carbonates, metal sulfates, metal phosphates and metal hydroxides, and mixtures thereof; said catalyst agent being a crystal of thymol.

17. The process of claim 16 wherein the liquid dental composition comprises in admixture (1) 65–35 weight percent of the liquid organic compound, and (2) correspondingly, 35–65 weight percent of the inorganic compound.

References Cited

UNITED STATES PATENTS

| Re. 12,277 | 10/1904 | Bower | 106—35 |
| 2,154,413 | 4/1939 | Schlesinger | 32—15 |
| 2,644,232 | 7/1953 | Roubian | 32—15 |

LOUIS G. MANCENE, *Primary Examiner.*

R. E. MORGAN, *Examiner.*